United States Patent [19]

Morikawa et al.

[11] Patent Number: 5,385,311
[45] Date of Patent: Jan. 31, 1995

[54] BREAKING EQUIPMENT

[75] Inventors: Sumio Morikawa, Sakai; Toshiji Ohga, Moriguchi; Hiroyuki Satone, Mino; Nobuyuki Zakohji, Toyonaka, all of Japan

[73] Assignee: Ohyodo Komatsu Co., Ltd., Neyagawa, Japan

[21] Appl. No.: 165,090

[22] Filed: Dec. 13, 1993

[30] Foreign Application Priority Data

Jan. 26, 1993 [JP] Japan .................. 5-010368

[51] Int. Cl.$^6$ ............................ B02C 1/06
[52] U.S. Cl. .................. 241/266; 241/101.7
[58] Field of Search .......... 241/101.7, 264, 266, 241/291; 30/134

[56] References Cited

U.S. PATENT DOCUMENTS

| 4,890,798 | 1/1990 | Tagawa et al. | 241/266 |
| 4,934,616 | 6/1990 | Zepf | 241/266 |
| 4,951,886 | 9/1990 | Berto | 241/101.7 |
| 4,961,543 | 10/1990 | Sakato et al. | 241/266 |

FOREIGN PATENT DOCUMENTS

| 137693 | 4/1985 | European Pat. Off. . |
| 347371 | 12/1989 | European Pat. Off. . |
| 119846 | 5/1901 | Germany . |
| 8904094 | 5/1990 | Germany . |
| 58-30990 | 7/1983 | Japan . |
| 63-40061 | 2/1988 | Japan . |
| 2-232470 | 9/1990 | Japan . |
| 2232470 | 9/1990 | Japan . |
| 2146918 | 5/1985 | United Kingdom . |
| 0280350 | 7/1990 | U.S.S.R. ................ 241/266 |
| WO91/08874 | 6/1991 | WIPO . |

Primary Examiner—Mark Rosenbaum
Assistant Examiner—John M. Husar
Attorney, Agent, or Firm—Nikaido, Marmelstein, Murray & Oram

[57] ABSTRACT

Breaking equipment comprising a mounting bracket that is attached to an arm of a power shovel for vertical pivotal movement, a holder frame mounted on the mounting bracket for swivel movement, a hydraulic motor attached to the mounting bracket for rotatably and reversibly driving the holder frame or a swivel break mechanism which is used in place of the hydraulic motor for restricting swivel movement of the holder frame, a pair of pivot arms of a symmetrically L-shaped configuration attached at their mid points to the holder frame by means of pivot axes, the pivot axes being separated apart a predetermined distance H from one another so as to satisfy the equations; $a = < b$ and $H = < 2h$, wherein, a is a distance from the pivot point to the forward end of each of the pivot arms, b is a distances from the pivot point to the rearward end of each of the pivot arms, and h is a distance from the blade edge vertically to the line connecting the pivot point and the forward point of the application, a hydraulic cylinder connected between the pair of pivot arms and blade bases and breaking attachments attached to the opposite inner surfaces thereof at a point forward of the mid-point.

8 Claims, 6 Drawing Sheets

FIG. 1
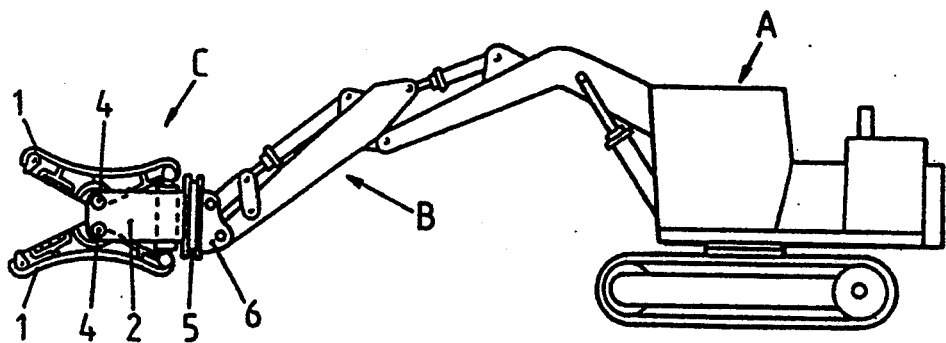
FIG. 2A
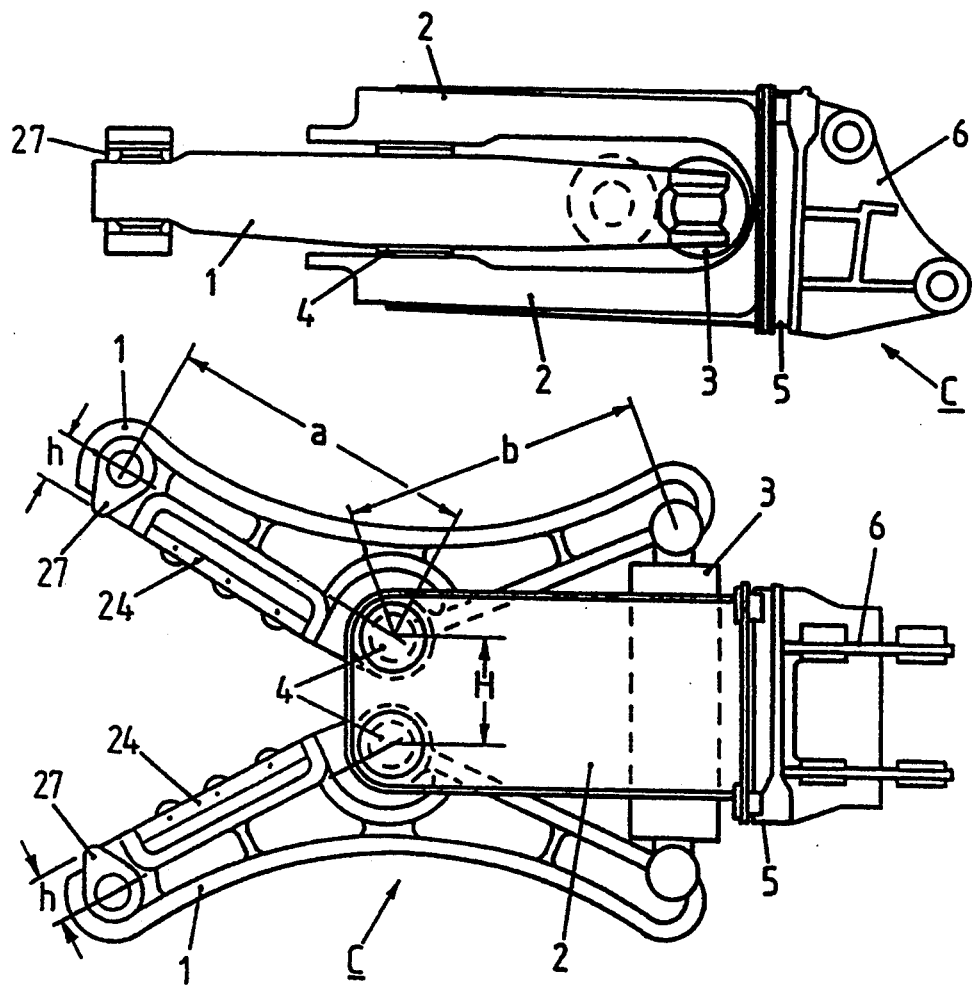
FIG. 2B

FIG. 6A
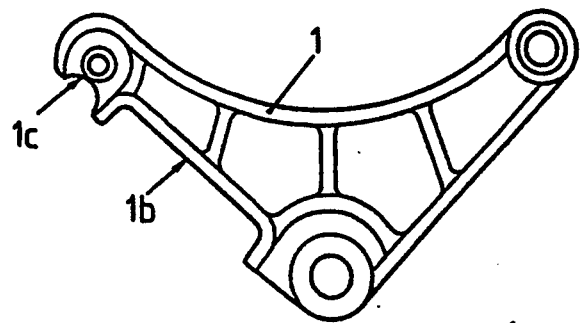
FIG. 6B
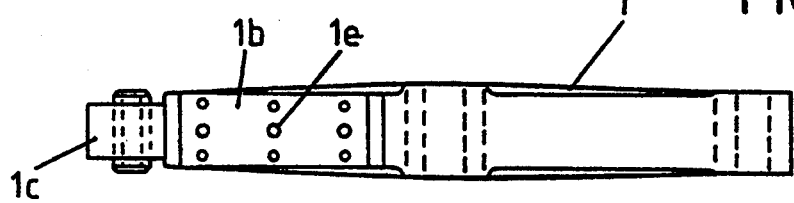
FIG. 6C
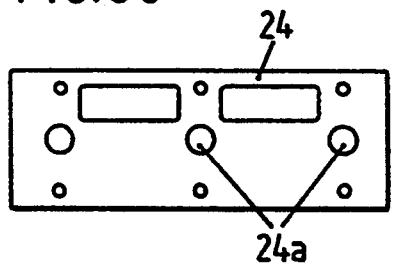
FIG. 6F
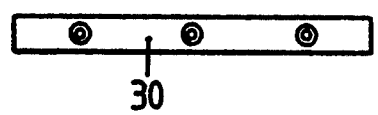
FIG. 6G
FIG. 6D
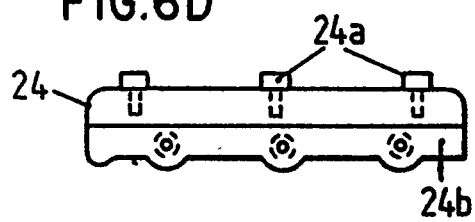
FIG. 6E
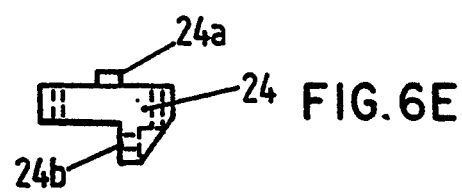
FIG. 6H
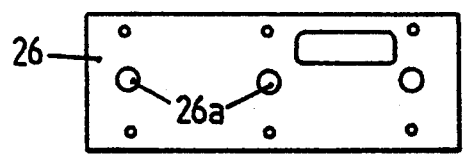
FIG. 6J
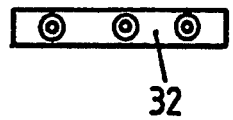
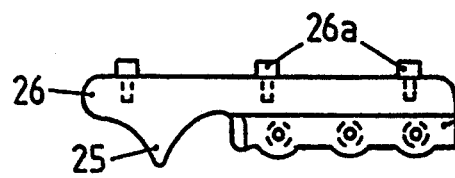
FIG. 6I

BREAKING EQUIPMENT

BACKGROUND OF THE INVENTION

1. Field of the Invention

This invention relates to a breaking equipment to be attached to the forward end of an arm of a power shovel, for example, for use in breaking steel bars, useless reinforced concrete construction under reduced noise circumstance.

2. Statement of the Prior Art

A kind of the above breaking equipment is known in the art which includes a pair of pivot arms pivotably connected at the mid-point thereof to a hold frame. A hydraulic cylinder is connected between the rearward ends of the pivot arms. Contraction and expansion of the hydraulic cylinder causes breaking action of the forward ends of the pivot arms relative to concrete body clamped therebetween. The whole breaking equipment is attached to a mounting bracket through the hold frame so as to be pivoted by means of a hydraulic motor (refer to Japanese Patent Publication No. 58-30990, for example). Another equipment having no hydraulic motor is also disclosed in Japanese Patent Public Disclosure No. 2-232470. Such equipment includes a holder frame pivotably connected to a mounting bracket, the holder frame being restricted from free pivotable movement by means of a brake mechanism.

Although such conventional breaking devices are advantageous to some extent, they are not usable singly to conduct various works or operations which may vary depending upon different work sites.

SUMMARY OF THE INVENTION

The object of the invention is to overcome the above problem by providing a breaking equipment with increased operability.

In order to achieve the above object the present invention provides a breaking equipment which comprises a mounting bracket attached to an arm of a power shovel main body at the forward end thereof for vertically pivotable movement, holder frame mounted to the mounting bracket for swivel movement, a hydraulic motor attached to the mounting bracket for rotatably and reversibly driving the holder frame, a swivel brake mechanism adapted to be mounted to the mounting bracket in place of the hydraulic motor for restricting swivel movement of the holder frame, a pair of pivot arms of a symmetrically L-shaped configuration pivotably attached, at their respective substantially mid-points, to the holder frame by means of separate pivot axes for open-close pivotable movement, the pivot axes being spaced apart a predetermined distance H from one another so as to satisfy the equations; $a = < b$ and $H = < 2h$, wherein, a is a distance from the pivot point to the forward end of each of the pivot arms, b is a distance from the pivot point to the rearward end of each of the pivot arms, and h is a distance from the blade edge vertically to the line connecting the pivot point and the forward point of application (the point at which a forward end attachment is connected to the pivot arm), a hydraulic cylinder connected between the pair of pivot arms at the rearward ends thereof for opening/closing the pivot arms (or two hydraulic cylinders connected between the rearward ends of the pivot arms and the holder frame), a blade base for a long cutter and a blade base for a short cutter removably attached to each of the pivot arms in the opposite inner surfaces thereof at a point forwardly of the mid-point, and a coarse cutting attachment and a fine cutting attachment removably attached to each of the pivot arms in the forward, opposite inner surfaces thereof.

In accordance with the invention, the hydraulic cylinder is of a multi-stage telescopic cylinder construction so as to facilitate quick open/close operation.

When the hydraulic cylinder is supplied with hydraulic pressure to be actuated, the pair of pivot arms will be pivoted about the respective pivot axes to be opened and closed, so as to perform various operation, such as, crushing of material to be deconstructed, steel bars, reinforced concrete, for example, cutting of steel bars etc. by means of short cutters, cutting of steel frames, such as I-steel, by means of long cutters, coarse cutting of concrete body by means of the coarse cutting attachment constituting a forward-end attachment, and further fine cutting of the above broken concrete body by means of the fine cutting attachment constituting a forward end attachment.

The swivel brake mechanism and hydraulic motor may be replaceably and selectively used depending upon given size of a breaking equipment and condition of a particular work site. When the swivel brake mechanism is installed, the pair of pivot arms, clamping objective material therebetween, are pivoted against the braking force of the swivel brake mechanism, so that the breaking action of the pivot arms is perpendicularly applied to the material clamped as the clamping action progresses, to thereby prevent undue force to be applied to the pivot arms. When the hydraulic motor is installed, the angle or orientation of the pair of pivot arms may be changed by means of hydraulic pressure.

The distance a from the pivot point to the forward end of each of the pair of pivot arms and the distance b from the pivot point to the rearward end of each of the pair of pivot arms are determined so as to be $a = < b$. Thus, the force from the hydraulic cylinder can be multiplied by a predetermined leverage ratio so as to obtain increased breaking force with a relatively small hydraulic cylinder.

Due to the symmetrically L-shaped configuration of the pair of pivot arms, opening width at the forward end of the pivot arms may be increased, so as to obtain increased initial breaking force. Since wall thickness of the pivot arms is reduced, it is possible for the pivot arms to be lightened.

Since the amount of offset H or distance between the pivot axes of the pair of pivot arms, and the distance h from the blade edge vertically to the line connecting the pivot point and the forward-end point of application (the point at which the forward attachment is attached) of each of the pivot arms are determined to be $H = < 2h$, the pair of pivot arms, during closing operation thereof, securely cut steel bars, steel frames, etc.

When the substantially L-shaped configuration of the pair of pivot arms, and two hydraulic cylinders for opening/closing the pair of pivot arms, in accordance with the invention, are combined, the direction in contraction and expansion of the hydraulic cylinders (i.e., the direction in which hydraulic pressure is applied) at the maximum opening of the pivot arms is oriented substantially normal to the rearward end of the pivot arms. Thus, substantially the whole hydraulic pressure from the hydraulic cylinders may be effectively used as initial breaking force of the pivot arms. In other words, hydraulic pressure of the hydraulic cylinder in the double cylinder system may be more effectively utilized for braking operation, comparing to the single cylinder system.

When the hydraulic cylinder is of the telescopic cylinder construction, such hydraulic cylinder, upon closing operation of the pivot arms, will be actuated gradually with the piston having a larger effective area, so that maximum breaking force will be exerted at the Initial stage of breaking in which maximum breaking force is required. The breaking force will be gradually decreased as the breaking operation proceeds. In addition to the above, closing speed of the pivot arms will be gradually increased. On the other hand, when the pair of pivot arms are opened, the operation will be proceeded in a reversed or contrariwise manner, and thus opening speed will be increased. Thus, it is possible to increase the cycle time of breaking operation.

BRIEF DESCRIPTION OF THE DRAWINGS

For a better understanding of the invention, and to show how the same may be carried out into effect, reference will now be made, by way of example, to the accompanying drawings in which like reference characters refer to like elements.

FIG. 1 is a diagrammatic side elevational view of a breaking equipment in accordance with the invention which is mounted on a power shovel.

FIGS. 2(A) and 2(B) are a plan view and a side elevational view, respectively, of a first embodiment of a breaking equipment according to the invention.

FIGS. 6(A) and 6(B) are a side elevational view and a development, bottom view, respectively, of a pivotable arm, FIGS. 6(C), 6(D) and 6(E) are a rear side view, a side view and an end view, respectively, of a cutter base for a long cutter, FIGS. 6(F) and 6(G) are a plan view and a cross-sectional view, respectively, of the long cutter, FIGS. 6(H) and 6(I) are a rear side view and a side elevational view, respectively, of a cutter base for a short cutter, and FIG. 6(J) is a plan view of the short cutter.

DETAILED DESCRIPTION OF THE PREFERRED EMBODIMENTS

Figure 3A:
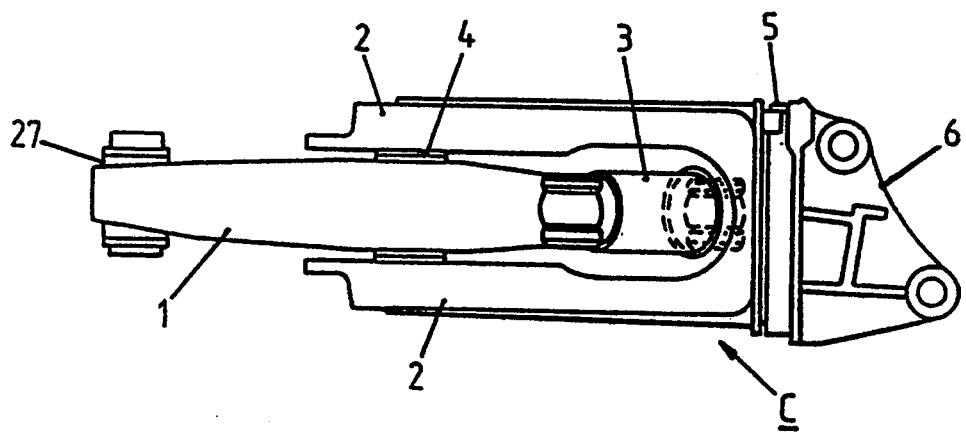
FIGS. 3(A) and 3(B) are a plan view and a side elevational view, respectively, of a second embodiment of a breaking equipment according to the invention.

The invention will be explained in detail below with reference to several embodiments illustrated in the drawings.

FIG. 1 is a diagrammatic side elevational view of a power shovel to which a breaking equipment of the invention is mounted. Reference characters A, B and C designate a power shovel body, an arm and a breaking equipment, respectively.

Figure 3B:
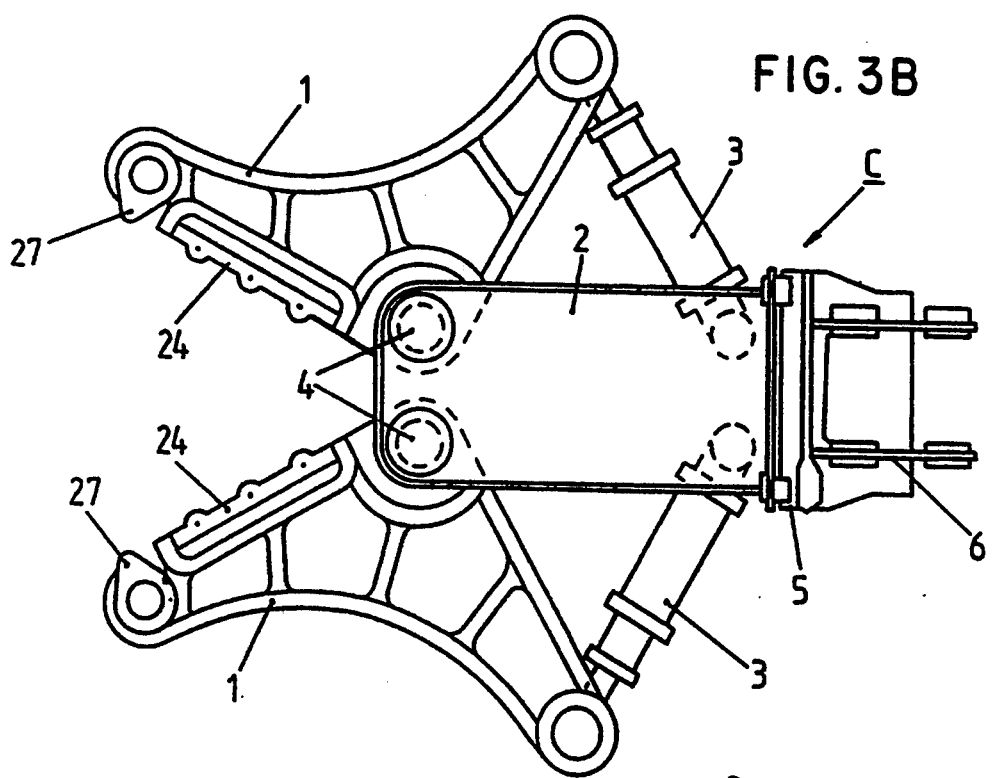
Figure 3C:
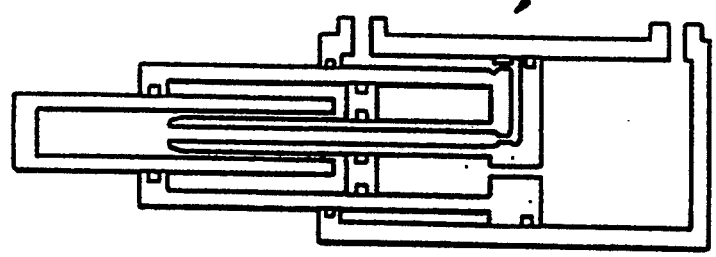
FIG. 3(C) is a diagrammatic, longitudinally sectional view showing an alternative arrangement of a hydraulic cylinder of the second embodiment.

The breaking equipment C is so constructed that, as shown in FIGS. 2(A) and 2(B), a pair of pivotable arms 1, 1 is pivotably connected to a holder frame 2 whereby the arms may be opened and closed in response to the contraction and expansion of a single hydraulic cylinder 3. Alternatively, the breaking equipment can be so constructed that, as shown in FIGS. 3(A) and 3(B), the pair of pivotal-arms 1, 1 is pivotably connected to the holder frame 2 whereby the arms may be opened and closed in response to the contraction and expansion of separate hydraulic cylinders 3, 3. When separate hydraulic cylinders are employed, it is preferable to use a multi-stage, telescopic cylinder construction, as shown in FIG. 3(C), in order to reduce cycle time of breaking operation. A multi-stage, telescopic cylinder construction may be applied also to a single hydraulic cylinder 3.

The pair of pivotable arms 1, 1 is of a symmetrically L-shaped configuration so as to reduce excessive thickness thereof, so as to be of a compact and lightweight construction, and so as to enlarge the opening width of the tip portion thereof. The pivotable arms are pivotably connected to the holder frame 2 at their respective substantially Intermediate portions in a symmetrical manner by means of separate pivot axes 4, 4, with the intermediate portions being offset by a predetermined distance with respect to the holder frame, so as to exert breaking force effectively on the opening. The length a from the pivot axis 4 to the forward end of the pivotable arm 1 and the length b from the pivot axis 4 to the rearward end of the arm are designed so that a is equal to or smaller than b. The offset value H between the pivot axes 4, 4 is determined so that H is equal to or smaller than 2h, wherein h is a distance measured from the blade tip perpendicularly to the line connecting the pivot point of the pivotable arm 1 and distal point of application (the point at which the tip attachment is mounted).

The holder frame 2 forks into two branches toward the front portion thereof. Each of the pivotable arms 1, 1 is pivotably connected between the tip ends of the holder frame by means of the respective pivot axis 4, 4 for facilitating open and close operation thereof. The rearward portion of the holder frame 2 is attached to mounting brackets 6 for freely swivel movement by means of a bearing 5 for a rotatable seat. The mounting brackets 6 are connected to the tip portion of an arm B of the power shovel body A for vertically swivel movement by means of the respective pins.

Figure 4A:
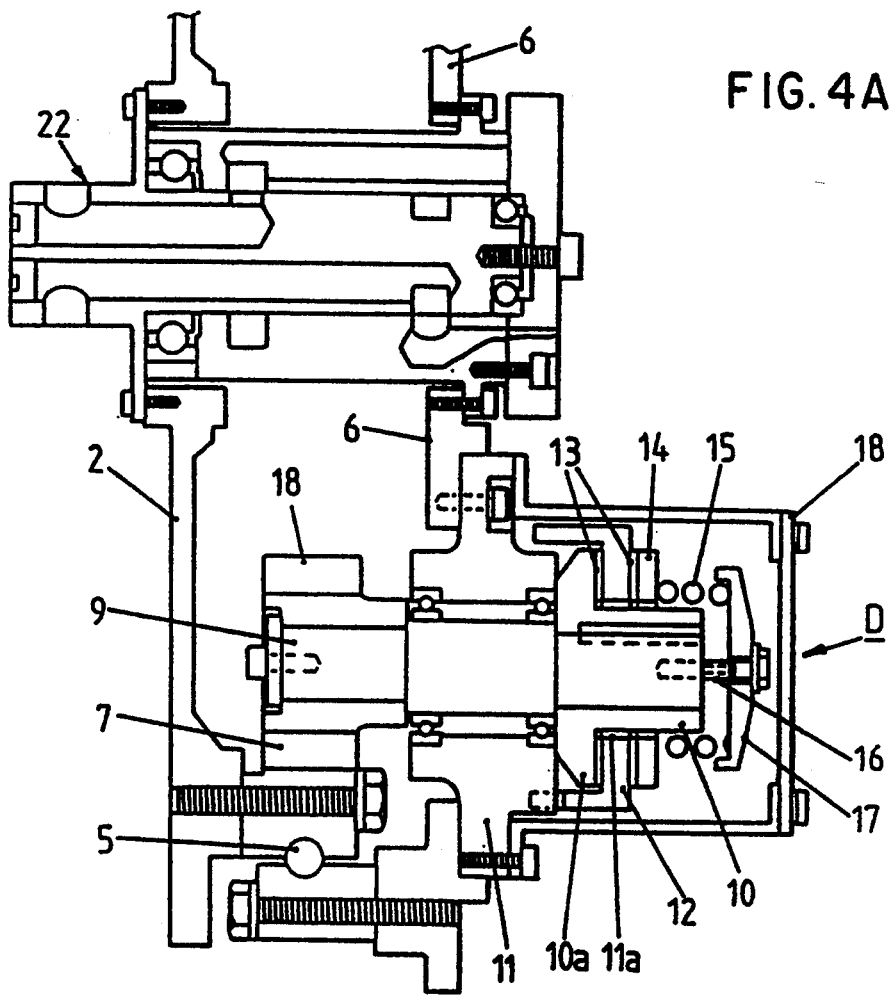
FIGS. 4(A) is an enlarged longitudinally sectional view of one example of a swivel brake mechanism.
Figure 5:
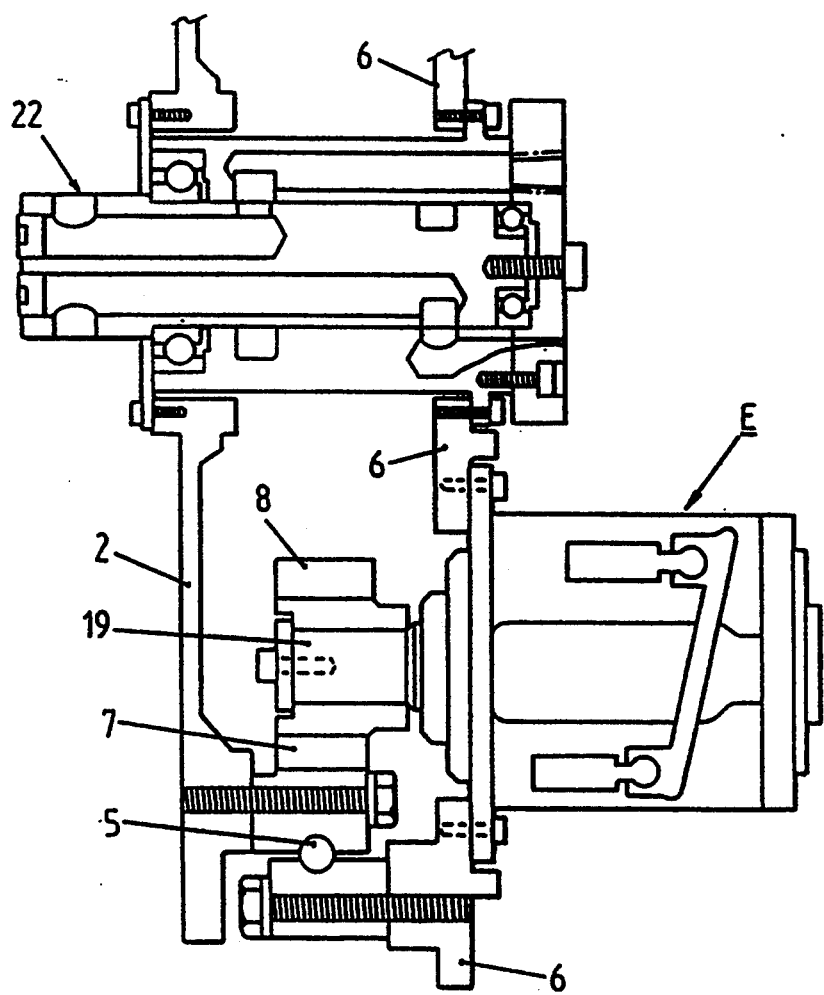
FIG. 5 is an enlarged, longitudinal cross-sectional view of one example of a swingably driving mechanism employing a hydraulic motor.

A ring gear 7 having internal teeth is integrally fixed to the holder frame 2 at the rearward end thereof, as shown in FIG. 4(A) and FIG. 5. A pinion 8 in mesh with the ring gear 7 is rotatably journalled by the mounting bracket 6 via a pinion shaft 9.

The pinion shaft 9 is, in removable fashion, connected with a swivel brake mechanism D for limiting free swivel movement of the holder frame 2, or with a hydraulic motor E for reversibly and rotatably driving the holder frame 2.

The swivel brake mechanism D includes, as shown in FIG. 4(A), a hub 10 fitted over and secured to the rearward end of the pinion shaft 9 by means of a key, a disk 12 freely received by the hub 10 via a bushing 11a and locked to a bearing flange 11 fixed to the mounting bracket 6, a pair of friction plates 13 on either side of the disk 12, a coil spring 15 applying biassing force to the friction plates 13 through a plate 14, and an adjust bolt 16 threadingly engaged with the rearward end of the pinion shaft 9 for adjusting biassing force of the coil spring 15 by means of a pressure plate 17. A cover 18 covers the swivel brake mechanism in its entirety. Normally, the disk 12 locked to the bearing flange 11 fixed to the mounting bracket 6 is urged against a flange portion 10a of the hub 10 via the friction plate 13,13 by the action of the coil spring 15, so as to limit rotational movement of the pinion shaft 9. Thus, rotational movement of the ring gear 7 is limited, so as to limit free swivel movement of the holder frame 2. Accordingly, the swivel brake mechanism D serves as a torque limiter for restricting free swivel movement of the holder frame 2. The restriction torque may be adjustably set exteriorly by means of the adjustment bolt 16.

As shown in FIG. 5, a hydraulic motor E can be mounted to the mounting bracket 6 with the forward end of an output shaft 19 fixed to the pinion 8, after removing the whole swivel brake mechanism D including the pinion shaft 9, together with the bearing flange 11 from the mounting bracket 6.

A swivel joint 22 for connecting hydraulic conduits is journalled between the mounting bracket 6 and the rearward end of the holder frame 2, as shown in FIGS. 4(A) and 5. The position of the swivel joint 22 is selected so as to define a center of rotation of the holder frame 2 relative to the mounting bracket 6.

A hydraulic power unit is mounted on the power shovel main body A and driven by an engine of the power shovel main body A. Hydraulic pressure generated in the hydraulic power unit is directed, by means of hydraulic conduits, through a vertical or up/down cylinder on the arm B of the power shovel main body and a vertical or up/down cylinder on the mounting bracket 6 at the forward end of the arm B, and through the forward end of the arm B to the swivel joint 22. The hydraulic conduit is branched into two conduits each for a hydraulic cylinder 3 for opening/closing the pair of pivot arms 1, 1, and the hydraulic motor E. A directional solenoid valve is interposed in each of the hydraulic conduits. The solenoid valves can be remotely operated from the operator room of the power shovel main body A.

Figure 4B:
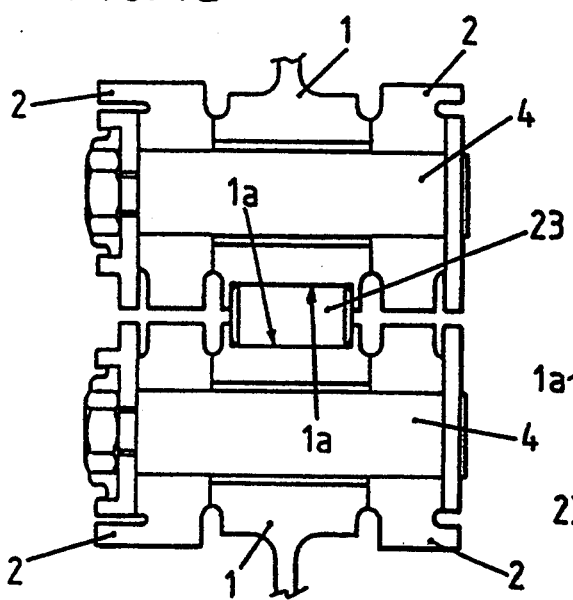
FIGS. 4(B) and 4(C) are an enlarged cross-sectional view, in part, and a longitudinal cross-sectional view, respectively, of one example of a synchronous pivoting mechanism.
Figure 4C:
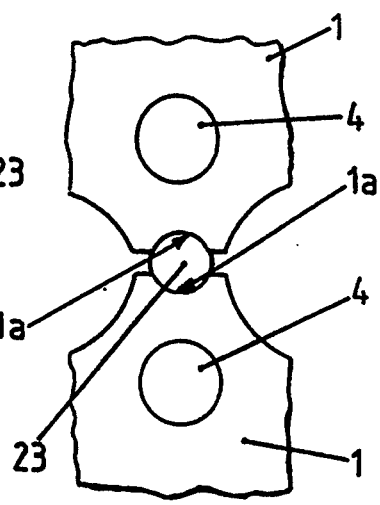

A pair of opposite recesses 1a, 1a of a substantially arcuate configuration are formed in the respective pivot arms 1, 1 at a position adjacent to the respective pivot axes 4, 4 of the pivot arms 1, 1 and spaced equidistantly from the respective pivot axes, as shown in FIGS. 4(B) and 4(C). A synchronous pin 23 is clamped between the recesses 1a, 1a. Thus, when one of the arms 1 is rotated, the synchronous pin 23 is rotated about its pivot axis 4 by means of one of the recesses 1a, so that the other pivot arm 1 is caused to be rotated the same angle about its axis 4 by means of the other recess 1a in synchronous with the one pivot arm. This synchronous pivot mechanism is employed only in the single cylinder type. It should be noted, however, that the synchronous pivot mechanism may preferably employed when a multi-stage telescopic cylinder construction is used in the singly cylinder type.

A mounting recess 1b is formed in each of the inner surfaces of the pair of pivot arms 1, 1, in an opposed manner, at a position forwardly of the mid-point of the pivot arms, as shown in FIGS. 7(A) to 7(L). Each of the mounting recesses is used to removably mount therein a blade base 24 for a long cutter and a cutter blade base 26 for a short cutter having a forward, integral crusher 25, the blade bases constitute a longer and shorter attachment for cutting steel bars and reinforced concrete. A recess 1c is formed in the forward-end, inner surface of the pair of pivot arms 1, 1 in an opposed manner for removably mounting therein a coarse cutting attachment 27 and a fine cutting attachment 28, the attachments constituting a forward-end attachment.

Figure 7A:
FIGS. 7(A), 7(B), 7(C) and 7(D) are a left-hand side view, a mid-longitudinal sectional view, a front view and a right hand side view respectively, of a coarse cutting attachment.
Figure 7B:
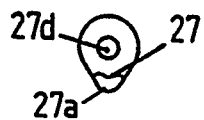
Figure 7C:
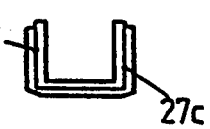
Figure 7D:
Figure 7E:
FIGS. 7(E), 7(F), 7(G) and 7(H) are a left-hand side view, a mid-longitudinal sectional view, a front view and a right-hand side view, respectively, of a fine cutting attachment.
Figure 7F:
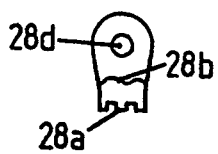
Figure 7G:
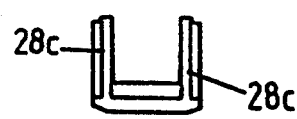
Figure 7H:
Figure 7I:
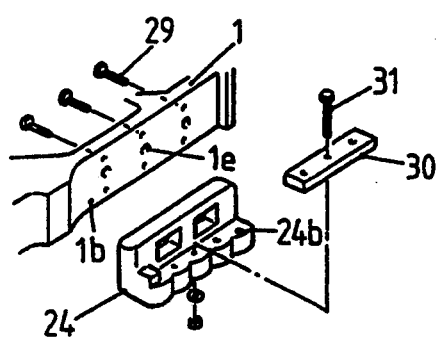
FIG. 7(I) is a exploded perspective view illustrating mounting of the cutter base for the long cutter.
Figure 7J:
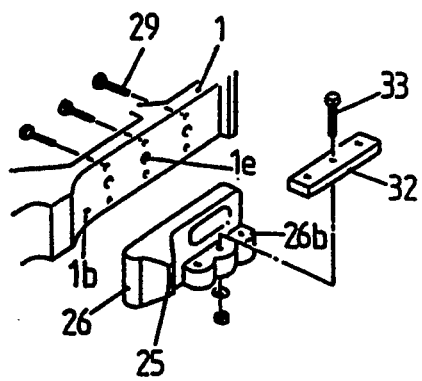
FIG. 7(J) is an exploded perspective view illustrating mounting of the cutter base for the short cutter.
Figure 7K:
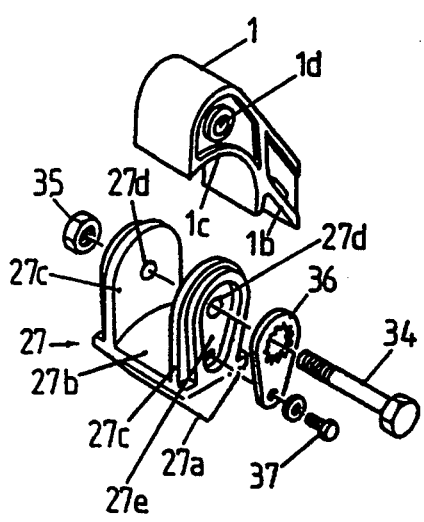
FIG. 7(K) is an exploded perspective view illustrating mounting of the coarse cutting attachment.
Figure 7L:
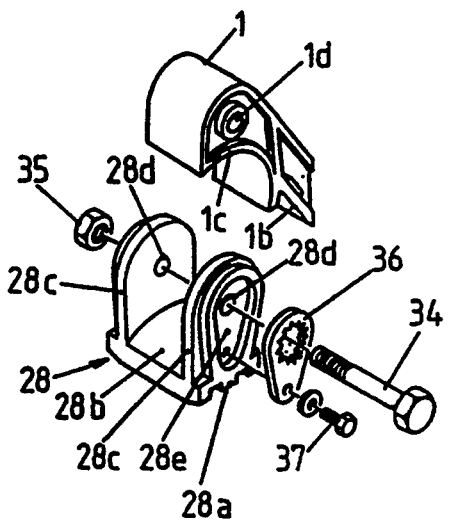
FIG. 7(L) is an exploded perspective view illustrating mounting of the fine cutting attachment.

The blade base 24 for a long cutter has an L-shaped cross-section, as shown in FIGS. 6(D), 6(E) and 7(I). The blade base 24 includes, in its rearward surface, a plurality (e.g., three) of positioning protrusions 24a to be fitted into respective positioning holes 1e in the recess 1b of the pivot arm 1. With the protrusions fitted into the respective positioning holes, the blade base 24 for a long cutter is secured to the pivot arm 1 in the recess 1b by means of a plurality (e.g., six) of bolts 29. A mounting stage 24b is formed in the front surface of the blade base 24 for a long cutter along its entire length for securing thereto a long cutter 30 by means of a plurality of bolts 31.

The blade base 26 for a short cutter 26 has the same length as the blade base 24 for a long cutter, as shown in FIGS. 6(H)–6(J) and 7(J). The blade base 26 includes, in its rearward surface, a plurality (e.g., three) of positioning protrusions 26a to be fitted into respective positioning holes 1e in the recess 1b of the pivot arm 1. With the protrusions fitted into the respective positioning holes, the blade base 26 for a short cutter is secured to the pivot arm in the recess 1b by means of a plurality (e.g., six) of bolts 29. The blade base 26 for a short cutter is formed with a crusher 25 in its forward portion. The blade base 26 is formed in its rearward portion with an L-shaped mounting stage 26b for securing thereto a short cutter 32 by means of a plurality of bolts 33.

The blades attached to the pair of pivot arms 1, 1 are so arranged that they may be closed in a staggered or scissors like fashion for shearing or cutting steel bars or reinforced concrete. On the other hand, the crushers 25 are arranged in an opposite manner so as to crush material to be deconstructed, concrete body for example, in an abutting manner.

The coarse cutting attachment 27 constituting a forward-end attachment includes, in its forward-end surface, a single protrusion 27a for coarsely or roughly cutting material to be deconstructed, as shown in FIGS. 7(A)–7(D) and 7(K). The rearward surface of the attachment 27 is formed into a convexly arcuate surface 27b so as to be complementarily fitted in the recess 1c of the pivot arm 1. The attachment 27 also includes a pair of mounting rugs 27c, 27c integral therewith on opposite sides of the rearward surface thereof, the rugs extending rearwardly of the rearward surface. The attachment 27 is secured to the pivot arm 1 with the forward end of the pivot arm clamped between the mounting rugs by means of a bolt 34 and a nut 35. The forward end of the pivot arm 1 and the mounting rugs 27c, 27c are formed with respective bolt holes, 1d, 27d, 27d. One of the mounting rugs 27c is formed with a recess 27e for receiving therein a retainer plate 36 which, in turn, receives therein the head of the bolt 34 in order to prevent rotation of the bolt. The retainer plate 36 is secured in the recess 27e by means of a bolt 37. The coarse cutting attachment 27 is attached to each of the pair of pivot arms 1,1 at the forward end thereof in an opposed manner, so as to roughly crush material to be deconstructed.

The fine cutting attachment 28 constituting the remaining forward-end attachment includes, in its forward surface, a plurality of separate protrusions 28a, as shown in FIGS. 7(E)–7(H) and 7(L). The rearward surface 28b of the attachment 28 is formed into a convexly arcuate surface so as to be complementarily fitted in the recess 1c of the pivot arm 1. The attachment 28 also includes a pair of mounting rugs 28c, 28c integral therewith on opposite sides of the rearward surface thereof, the rugs extending rearwardly of the rearward surface. The attachment 28 is secured to the pivot arm 1 with the forward end of the pivot arm 1 clamped between the mounting rugs 28c, 28c by means of a bolt 34 and a nut 35. The forward end of the pivot arm 1 and the mounting rugs 28c, 28c are formed with respective bolt holes, 1d, 28d, 28d. One of the mounting rugs 28c is formed with a recess 28e for receiving therein a retainer plate 36 which, in turn, receives therein the head of the bolt 34 in order to prevent rotation of the bolt. The retainer plate 36 is secured in the recess 28e by means of a bolt 37. The fine cutting attachment 28 is attached to each of the pair of pivot arms 1,1 at the forward end thereof in an opposed manner, so as to finely crush material to be deconstructed.

The invention is constructed as described in the above. One example of operation will be explained below. Firstly, the power shovel main body A is operated to actuate the arm B and the breaking equipment C.

The power requisite for actuating the arm and breaking equipment is supplied from the hydraulic power unit driven by the engine of the power shovel main body A and controlled by operation levers or operation buttons. The hydraulic cylinder 3 of the breaking equipment C is supplied with a hydraulic power from the power shovel main body A through a hydraulic conduit extending along the arm B, and through the swivel joint 22 on the mounting bracket 6. When two-cylinder system is employed, two hydraulic cylinders 3, 3 are connected in parallel to the hydraulic power source.

When the hydraulic cylinder 3 is supplied with hydraulic pressure and extended thereby, the pair of pivot arms 1, 1 are actuated to be opened and closed about the respective pivot axes 4, 4, so as to crush maximum sized material by means of the attachments 27, 28, so as to cut steel bars etc., by means of the short cutters 32, so as to cut steel frames such as I-steel by means of the long cutters 30, so as to crush concrete material into small pieces by means of the crushers 25, and so on.

The swivel brake mechanism D and hydraulic motor E may be selectively used depending upon condition or circumstance of a particular work site, since they are designed to be removably attached to the pinion shaft 9 at its rearward end. When the swivel brake mechanism D is installed, the pair of pivot arms 1, 1 are pivoted by the reaction force of breaking operation against the braking force of the swivel brake mechanism D during breaking of objective material between the pivot arms 1, 1, thus preventing undue force to be applied to the pivot arms 1, 1. When the hydraulic motor E is installed, the angle or orientation of the pair of pivot arms 1, 1 may be changed by means of hydraulic pressure. With providing a bypass valve between the inlet hydraulic conduit and outlet hydraulic conduit of the hydraulic motor E, it is possible to relieve undue force to be applied to the pivot arms by opening the bypass valve In accordance with the invention, it is possible for a single machine to conduct various works or operations, such as, cutting and breaking of material to be deconstructed, for example, steel bars, reinforced concrete, etc., cutting of steel bars, steel frames contained in such material, coarse of fine cutting of concrete material, etc.

The swivel brake mechanism and hydraulic motor may be replaceably and selectively used depending upon condition of a particular work site. When the swivel brake mechanism is installed, the pair of pivot arms are pivoted, depending upon repulsive force exerted thereto, against the braking force of the swivel brake mechanism during breaking objective material between the pivot arms, so as to prevent undue force to be applied to the pivot arms. When the hydraulic motor is installed, the angle or orientation of the pair of pivot arms may be changed by means of hydraulic pressure.

The distance a from the pivot point to the forward end of each of the pair of pivot arms and the distance b from the pivot point to the rearward end of each of the pair of pivot arms are determined so as to be a=<b. Thus, the force from the hydraulic cylinder can be multiplied by a predetermined leverage so as to obtain increased breaking force.

When a telescopic cylinder is employed to actuate the pivot arms, maximum breaking force needed at maximum opening width may be obtained at maximum hydraulic pressure area of the hydraulic cylinder. The hydraulic pressure area will be gradually decreased as the opening width is decreased. It is noted, however, that a breaking force point approaches the pivot center of the arms, so that necessary and sufficient breaking force may be obtained even though the force for closing the arms is decreased. When the output of the hydraulic pump is kept constant during return stroke, it is possible for the pivot arms to be opened quickly, so as to advantageously reducing the operation time cycle.

Due to the symmetrically L-shaped configuration of the pair of pivot arms, opening width at the forward end of the pivot arms may be increased. Since wall thickness of the pivot arms is reduced, it is possible for the pivot arms to be lightened.

Since the amount of offset H or distance between the pivot axes of the pair of pivot arms, and the distance h from the blade edge vertically to the line connecting the pivot point and the forward-end point of application (the point at which the forward attachment is attached) of each of the pivot arms are determined to be H=<2h, the pair of pivot arms, during closing operation thereof, securely cut steel bars, steel frames, etc.

The principles, preferred embodiments and modes of operation of the present invention have been described in detail in the foregoing specification. It should be noted, however, that variations and changes may be made by those skilled in the art without departing from the spirit of the present invention. Accordingly, the foregoing detailed description should be regarded as exemplary in nature and not as limiting the scope and spirit of the invention set forth in the appended claims.

What is claimed is:

1. A breaking equipment comprising:

a mounting bracket attached to an arm of a power shovel main body at the forward end thereof for vertically pivotable movement;

a holder frame mounted to the mounting bracket for swivel movement;

a hydraulic motor attached to the mounting bracket for rotatably and reversibly driving the holder frame;

a pair of pivot arms of a symmetrically L-shaped configuration pivotably attached, at their respective substantially mid-points, to said holder frame by means of separate pivot axes for open-close pivotable movement, said pivot axes being spaced apart a predetermined distance H from one another so as to satisfy the equations; $a = < b$ and $H = < 2h$, wherein, a is a distance from the pivot point to the forward end of each of said pivot arms, b is a distance from the pivot point to the rearward end of each of said pivot arms, and h is a distance from the bald edge vertically to the line connecting the pivot point and the forward point of application, wherein the forward point of the application is the point at which a forward end attachment is connected to the pivot arm;

a hydraulic cylinder connected between said pair of pivot arms at the rearward ends thereof for opening/closing said pivot arms;

a blade base for a long cutter and a blade base for a short cutter removably attached to each of said pivot arms in the opposite inner surfaces thereof at a point forwardly of said mid-point; and a coarse breaking attachment and a fine breaking attachment removably attached to each of said pivot arms in the forward, opposite inner surfaces thereof.

2. A breaking equipment according to claim 1, wherein said hydraulic cylinder is of a multi-stage telescopic cylinder construction.

3. A breaking equipment comprising:
a mounting bracket attached to an arm of a power shovel main body at the forward end thereof for vertically pivotable movement;

a holder frame mounted to the mounting bracket for swivel movement;

a hydraulic motor attached to the mounting bracket for rotatably and reversibly driving the holder frame;

a pair of pivot arms of a symmetrically L-shaped configuration pivotably attached, at their respective substantially mid-points, to said holder frame by means of separate pivot axes for open-close pivotable movement, said pivot axes being spaced apart a predetermined distance H from one another so as to satisfy the equations; $a = < b$ and $H = < 2h$, wherein, a is a distance from the pivot point to the forward end of each of said pivot arms, b is a distance from the pivot point to the rearward end of each of said pivot arms, and h is a distance from the bald edge vertically to the line connecting the pivot point and the forward point of application, wherein the forward point of the application is the point at which a forward end attachment is connected to the pivot arm; two hydraulic cylinders connected between the rearward ends of said pivot arms and said holder frame;

two hydraulic cylinders connect between the rearward ends of said pivot arms and said holder frame;

a blade base for a long cutter and a blade base for a short cutter removably attached to each of said pivot arms in the opposite inner surfaces thereof at a point forwardly of said mid-point; and a coarse breaking attachment and a fine breaking attachment removably attached to each of said pivot arms in the forward, opposite inner surfaces thereof.

4. A breaking equipment according to claim 3, wherein each said hydraulic cylinder is of a multi-stage telescopic cylinder construction.

5. A breaking equipment comprising:
a mounting bracket attached to an arm of a power shovel main body at the forward end thereof for vertically pivotable movement;

a holder frame mounted to the mounting bracket for swivel movement;

a swivel brake mechanism adapted to be mounted to the mounting bracket for restricting swivel movement of said holder frame;

a pair of pivot arms of a symmetrically L-shaped configuration pivotably attached, at their respective substantially mid-points, to said holder frame by means of separate pivot axes for open-close pivotable movement, said pivot axes being spaced apart a predetermined distance H from one another so as to satisfy the equations; $a = < b$ and $H = < 2h$, wherein, a is a distance from the pivot point to the forward end of each of said pivot arms, b is a distance from the pivot point to the rearward end of each of said pivot arms, and h is a distance from the bald edge vertically to the line connecting the pivot point and the forward point of application, wherein the forward point of the application is the point at which a forward end attachment is connected to the pivot arm;

a hydraulic cylinder connected between said pair of pivot arms at the rearward ends thereof for opening/closing said pivot arms;

a blade base for a long cutter and a blade base for a short cutter removably attached to each of said pivot arms in the opposite inner surfaces thereof at a point forwardly of said mid-point; and a coarse breaking attachment and a fine breaking attachment removably attached to each of said pivot arms in the forward, opposite inner surfaces thereof.

6. A breaking equipment according to claim 5, wherein said hydraulic cylinder is of a multi-stage telescopic cylinder construction.

7. A breaking equipment comprising:
a mounting bracket attached to an arm of a power shovel main body at the forward end thereof for vertically pivotable movement;

a holder frame mounted to the mounting bracket for swivel movement;

a swivel brake mechanism adapted to be mounted to the mounting bracket for restricting swivel movement of said holder frame;

a pair of pivot arms of a symmetrically L-shaped configuration pivotably attached, at their respective substantially mid-points, to said holder frame by means of separate pivot axes for open-close pivotable movement, said pivot axes being spaced apart a predetermined distance H from one another so as to satisfy the equations; $a = < b$ and $H = < 2h$, wherein, a is a distance from the pivot point to the forward end of each of said pivot arms, b is a distance from the pivot point to the rearward end of each of said pivot arms, and h is a distance from the bald edge vertically to the line connecting the pivot point and the forward point of application, wherein the forward point of the application is the point at which a forward end attachment is connected to the pivot arm;

two hydraulic cylinders connected between the rearward ends of said pivot arms and said holder frame;

a blade base for a long cutter and a blade base for a short cutter removably attached to each of said pivot arms in the opposite inner surfaces thereof at a point forwardly of said mid-point; and a coarse breaking attachment and a fine breaking attachment removably attached to each of said pivot arms in the forward, opposite inner surfaces thereof.

8. A breaking equipment according to claim 7, wherein each said hydraulic cylinder is of a multi-stage telescopic cylinder construction.

* * * * *